United States Patent [19]
Ryoke et al.

[11] Patent Number: 4,497,864
[45] Date of Patent: Feb. 5, 1985

[54] MAGNETIC RECORDING MEDIUM

[75] Inventors: Katsumi Ryoke; Nobutaka Yamaguchi; Takashi Yoneyama; Eiichi Tadokoro, all of Kanagawa, Japan

[73] Assignee: Fuji Photo Film Co., Ltd., Kanagawa, Japan

[21] Appl. No.: 511,359

[22] Filed: Jul. 6, 1983

[30] Foreign Application Priority Data

Jul. 6, 1982 [JP] Japan ................................ 57-117402

[51] Int. Cl.$^3$ ........................... G11B 5/70; G11B 5/72
[52] U.S. Cl. ................................. 428/323; 252/62.54; 360/134; 360/135; 360/136; 427/128; 428/337; 428/340; 428/694; 428/695; 428/900
[58] Field of Search ............... 428/695, 694, 900, 323, 428/337, 340; 427/128; 252/62.54; 360/134–136

[56] References Cited

U.S. PATENT DOCUMENTS

| | | | |
|---|---|---|---|
| 4,289,828 | 9/1981 | Ota | 428/694 |
| 4,305,995 | 12/1981 | Ota | 428/694 |
| 4,409,300 | 10/1983 | Ohkawa | 428/694 |
| 4,414,289 | 11/1983 | Shibata | 428/695 |

Primary Examiner—Ellis P. Robinson
Attorney, Agent, or Firm—Sughrue, Mion, Zinn, Macpeak and Seas

[57] ABSTRACT

A magnetic recording medium is disclosed. The medium is comprised of a support base having coated thereon a magnetic layer comprised of ferromagnetic particles dispersed in a binder and further comprised of at least one anhydrosorbitol di- and/or tetra-fatty acid non-hydroxy ester. By including the particularly disclosed fatty acid non-hydroxy ester the running properties of the magnetic recording medium are greatly improved.

13 Claims, No Drawings

MAGNETIC RECORDING MEDIUM

FIELD OF THE INVENTION

This invention relates to a magnetic recording medium and, more particularly, to a magnetic recording medium having an excellent surface properties, a low coefficient of friction to magnetic recording and reproducing devices, and excellent lubricant properties.

BACKGROUND OF THE INVENTION

A magnetic recording medium having insufficient lubricating properties generally causes an increased coefficient of friction in its magnetic layer because the surface of the magnetic layer is made smooth by contacting with tape transport systems of magnetic recording devices. The magnetic recording medium having an increased coefficient of friction of magnetic layer adheres to the tape transport systems of the magnetic recording devices through small water drops, particularly at high humidity (i.e., more than about 60% of relative humidity). In this case, if the running tension is more than the adhering strength, the medium runs under the condition of stick slip and makes a running noise which is audible. A recording signal of a magnetic recording medium which runs under the stick slip condition causes a frequency modulation in the running direction of the medium, and, therefore, normal reproduction of the recorded signal is difficult. Where the recorded medium runs under the stick slip condition in the reproduction operation, normal reproduction is difficult because wow flutter and/or jitter occurs. On the other hand, if the adhering strength is more than the running tension, recording and reproduction operations are impossible because the medium does not run normally and causes so-called "tape squeal". Magnetic recording media and magnetic recording devices which cause such tape squeal are of no commercial value.

The tape squeal depends on materials, running tensions or running speed of tape transport systems in magnetic recording devices. It also depends on the increase of surface smoothness or surface abrasion coefficient of the magnetic recording medium.

Various solid and liquid lubricants have been employed to improve the surface lubricating properties of magnetic recording medium. Examples of such lubricants include inorganic or organic fine particles ($\alpha$-$Al_2O_3$, graphite, silica, $Cr_2O_3$, ZnO, carbon black, etc.), and organic surface active agents (higher hydrocarbon compounds, aliphatic alcohols, fatty acids, fatty acid esters, fatty acid amides, fatty acid salts, quaternary salts of fatty acids, etc., which may contain any number of carbon atoms and preferably have a boiling point of more than about 100° C. and a melting point of less than about 150° C.). These lubricants are generally used in an amount of 0.1 to 20 parts by weight per 100 parts by weight of binders.

However, even if these lubricants are used, a magnetic recording layer having satisfactory properties is not necessarily obtained. For example, if a large amount of the lubricants is used, the mechanical strength of the resulting magnetic layer is often lowered or, in some cases, they gradually come out on the surface of the magnetic layer. Further, the ferromagnetic particles are not sufficiently dispersed in the presence of a large amount of these additives. For example, when glycerol tristearate as disclosed in German OLS No. 3,210,417 and Japanese Patent Application (OPI) No. 119933/81 (the term "OPI" as used herein refers to a "published unexamined Japanese patent application") is added as a lubricant to a magnetic layer in an amount sufficient to prevent the tape squeal, such amount of glycerol tristearate adversely affects electromagnetic properties of the resulting magnetic layer and reduces the S/N ratio. Also, butyl palmitate which is also a typical example of lubricants as disclosed in Japanese Patent Application (OPI) No. 53402/74 is added to a magnetic layer in an amount sufficient to provide satisfactory tape running properties against stainless steel guide poles of magnetic recording devices, such amount of butyl palmitate often causes tape squeal at a magnetic head of the devices. Further, an anhydrosorbitol tri-fatty acid ester and an anhydrosorbitol mono-fatty acid ester have been known as lubricants as disclosed in Japanese Patent Publication No. 31442/72, but these esters lack adaptability to the manufacturing processes (e.g., high speed coating) of the magnetic recording medium because they react with isocyanates causing an increase in the viscosity of magnetic coating compositions with the passage of time.

SUMMARY OF THE INVENTION

A primary object of the present invention is to solve these disadvantages and to provide novel additives for a magnetic recording medium.

Another object of the present invention is to provide novel additives for a magnetic layer and to provide a magnetic recording medium having excellent running properties.

Still another object of the present invention is to provide a magnetic recording medium having a magnetic layer with improved surface properties.

Yet another object of the present invention is to provide a magnetic recording medium having excellent sensitivity.

Another object of the present invention is to provide a magnetic recording medium having an excellent storage stability whereby the additive does not come out on the surface of the magnetic layer over a long period of time.

Still another object of the present invention is to provide novel additives for a magnetic layer of a magnetic recording medium which has excellent adaptability to manufacturing processes.

These objects of the present invention can be attained by incorporating at least one of anhydrosorbitol fatty acid non-hydroxy ester compounds defined hereinafter into a magnetic layer. The term "non-hydroxy" as used herein means that no free hydroxy group is present in the molecule of the ester compound.

The anhydrosorbitol fatty acid non-hydroxy ester compounds used in the present invention include the anhydrosorbitol tetra-fatty acid non-hydroxy esters represented by the formulae (I) and (II):

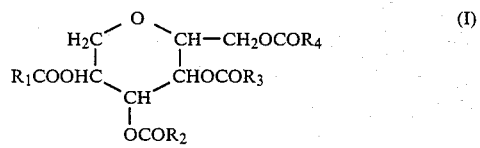

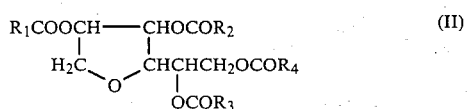

and the anhydrosorbitol di-fatty acid non-hydroxy ester represented by the formula (III):

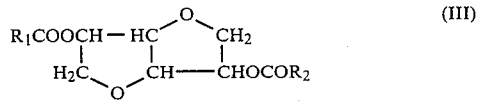

wherein $R_1$, $R_2$, $R_3$ and $R_4$ each represents a saturated alkyl group having 1 to 22 carbon atoms or an alkylene group having 2 to 22 carbon atoms.

These anhydrosorbitol di- or tetra-fatty acid non-hydroxy esters can be prepared from anhydrosorbitol described by Ryohei Oda et al., *Synthesis of Surface Active Agents and Application Thereof*, p. 152 (1972) published by Maki Shoten. Anhydrosorbitol tetrastearate is known as described in *Chemical Abstracts*, 55: 25421f and in Proc. 2nd Inter. Congress of Surface Activity, 1, 426 (1957) (by J. T. Davies).

The anhydrosorbitol di- and tetra-fatty acid non-hydroxy esters represented by the formulae (I), (II) and (III) can be easily prepared by dehydration-condensation reaction of anhydrosorbitol with a fatty acid in an amount of more than 4 mols per mol of anhydrosorbitol under alkaline reaction conditions while heating. The resulting product is a mixture of esters represented by the formulae (I), (II) and (III) and the mixture can be used in the present invention without isolating an individual ester. The anhydrosorbitol di-fatty acid non-hydroxy ester represented by the formula (III) is formed via the formation of sorbide which is a product of two-ring formation reaction took place during the dehydration-condensation reaction, as illustrated below.

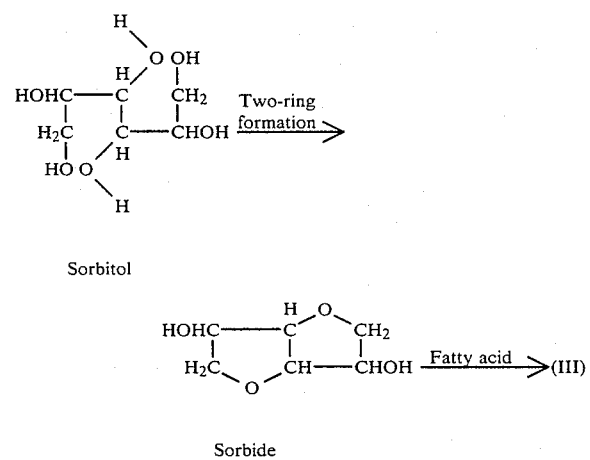

In the formulae (I), (II) and (III), the saturated alkyl group and the alkylene group represented by $R_1$, $R_2$, $R_3$ and $R_4$ preferably have up to 20 carbon atoms, more preferably up to 18 carbon atoms. Preferred ester groups represented by $R_1$, $R_2$, $R_3$ and $R_4$ are acetate, stearate, oleate, laurate, palmitate, and myristate, with acetate and stearate being particularly preferred.

Examples of useful ferromagnetic powders used in the present invention include $\gamma$-$Fe_2O_3$, cobalt-containing $Fe_2O_3$, $Fe_3O_4$, cobalt-containing $Fe_3O_4$, $CrO_2$, Co-Ni-P alloy, Co-Ni-Fe alloy, etc., as disclosed in U.S. Pat. Nos. 3,574,683 and 3,574,685, and Japanese Patent Publication Nos. 14090/69, 18372/70, 22062/72, 22513/72, 28466/71, 38755/71, 4286/72, 12422/72, 17284/72, 18509/72 and 18573/72. Preferred examples of ferromagnetic powders are $\gamma$-$Fe_2O_3$, Co-containing $\gamma$-$Fe_2O_3$ and Co-Ni-Fe alloy. The ferromagnetic powder can be used in an amount of 50 to 2,000 parts by weight based on 100 parts by weight of a binder.

The anhydrosorbitol di- and/or tetra-fatty acid ester is added in an amount in the range of 0.05 to 20 parts by weight, preferably 0.1 to 10 parts by weight, more preferably 0.5 to 5 parts by weight, based on 100 parts by weight of the ferromagnetic powder. The anhydrosorbitol di- and/or tetra-fatty acid ester can be incorporated into a magnetic layer in various manners, for example, by immersing the ferromagnetic powder in the ester, by mixing the ester with the ferromagnetic powder before or after the powder is dispersed into a binder, or by coating the ester on a magnetic layer. Further, the fatty acid ester can be coated on a back layer or a surface opposite to the magnetic layer, whereby it is transferred from the back layer or back surface of the support onto the magnetic layer, or can be sprayed on a magnetic layer. Further, it can be provided on the magnetic layer in a discontinuous state.

The anhydrosorbitol di- and/or tetra-fatty acid ester is particularly effective in the presence of a polyisocyanate compound having a reactivity with a hydroxy group, and is most effective in the presence of a carbon black having a large specific surface area having $S_{BET}$ of about 30 $m^2/g$ or more (a specific surface area determined by the Brunauer-Emmett-Teller method) and a viscosity-increasing function, and a polyisocyanate compound having a reactivity with a hydroxy group.

When the anhydrosorbitol di- and/or tetra-fatty acid non-hydroxy ester is used in combination with a polyisocyanate compound, the ester can be used at a proportion of about 0.05 to about 100 parts by weight per 100 parts by weight of the polyisocyanate compound. Since the ester does not contain any reactive group with the polyisocyanate compound, it can be combined with the polyisocyanate compound in any process step for producing the magnetic recording medium.

Preferred polyisocyanate compounds include diisocyanates, triisocyanates and tetraisocyanates. Typical examples of such polyisocyanate compounds are tolylene diisocyanate, 4,4'-diphenylmethane diisocyanate, hexamethylene diisocyanate, xylylene diisocyanate, isophorone diisocyanate, triphenylmethane triisocyanate and polyisocyanate derivatives obtained by reacting these isocyanates with dihydric to tetrahydric alcohols. Commercially available polyisocyanate compounds include Desmodur L (a product of Sumitomo-Bayer Co.), Coronate L (a product of Nippon Polyurethane Co.), Takenate (a product of Takeda Chemical Industries, Ltd.), Desmodur N, Coronate 2030, etc.

When the anhydrosorbitol di- and/or tetra-fatty acid ester is used in combination with carbon black, a ratio of the ester:carbon black can be in the range of 95:5 to 0.1:99.9 by weight.

In order to improve other surface properties such as surface roughness, surface hardness, surface electric resistance and running properties, it is possible to use various sizes of carbon black (average particle diameter: about 10 to 300 m$\mu$), a silicone oil, graphite, molybdenum disulfide, tungsten disulfide, a fatty acid ester composed of a monobasic fatty acid having 12 to 16 carbon atoms and a monohydric alcohol having 3 to 12 carbon atoms, and a fatty acid ester having a sum of 21 to 23 carbon atoms composed of a monobasic fatty acid having 17 or more carbon atoms and a monohydric alcohol.

These lubricants can be used in an amount of 0.2 to 20 parts by weight based on 100 parts by weight of a binder. These lubricants are disclosed in Japanese Patent Publication No. 23889/68, Japanese Patent Application Nos. 28647/67 and 81543/68, U.S. Pat. No. 3,423,233 and Japanese Patent Publication No. 28043/72.

Useful dispersing agents include fatty acids having 12 to 18 carbon atoms as represented by $R_5COOH$ wherein $R_5$ is an alkyl group having 11 to 17 carbon atoms such as caprylic acid, capric acid, lauric acid, myristic acid, palmitic acid, stearic acid, oleic acid, elaidic acid, linolic acid, linoleic acid, stearolic acid and the like.

A metal soap composed of an alkali metal (e.g., Li, Na, K) or alkali earth metal (e.g., Mg, Ca, Ba) salt of the above fatty acid, or lecithin can also be used in the present invention. Further, a higher alcohol having at least 12 carbon atoms and a sulfuric acid ester thereof can also be used. The amount of the dispersing agent is 1 to 20 parts by weight based on 100 parts by weight of a binder. These additives are disclosed in Japanese Patent Publication Nos. 28369/64, 17945/69 and 15001/73 and U.S. Pat. Nos. 3,387,993 and 3,470,021.

Examples of binders which can be used in the present invention include conventional thermoplastic resins, thermosetting resins, reactive resins and mixtures thereof.

The thermoplastic resins have a softening point of 150° C. or less, an average molecular weight of 10,000 to 200,000 and a polymerization degree of about 200 to 500, and include vinyl chloride-vinyl acetate copolymers, vinyl chloride-vinylidene chloride copolymers, vinyl chloride-acrylonitrile copolymers, acrylic acid ester-acrylonitrile copolymers, acrylic acid ester-vinylidene chloride copolymers, acrylic acid ester-styrene copolymers, methacrylic acid ester-acrylonitrile copolymers, methacrylic acid ester-vinylidene chloride copolymers, methacrylic acid ester-styrene copolymers, urethane elastomers, nylon-silicone resins, nitrocellulose-polyamide resins, polyvinyl fluoride, vinylidene chloride-acrylonitrile copolymers, butadiene-acrylonitrile copolymers, polyamide resins, polyvinyl butyral, cellulose derivatives (e.g., cellulose acetate butyrate, cellulose diacetate, cellulose triacetate, cellulose propionate or nitrocellulose), styrene-butadiene copolymers, polyester resins, chlorovinyl ether-acrylic acid ester copolymers, amino resins, synthetic rubbers and mixtures thereof.

These resins and polymers are disclosed in Japanese Patent Publication Nos. 6877/62, 12528/64, 19282/64, 5349/65, 20907/65, 9463/66, 14059/66, 16985/66, 6428/67, 11621/67, 4623/68, 15206/68, 2889/69, 17947/69, 18232/69, 14020/70, 14500/70, 18573/72, 22063/67, 22064/72, 22068/72, 22069/72, 22070/72 and 27886/72, etc.

These thermosetting resins and reactive resins have a molecular weight less than 200,000 in a coating composition and the molecular weight becomes indefinite upon heating after they are coated and dried due to condensation reaction or addition reaction. It is preferred that these resins do not soften or melt at a temperature below their thermal decomposition temperature. Typical examples of the resins include phenol resins, epoxy resins, polyurethane hardening type resins, urea resins, melamine resins, alkyd resins, silicone resins, acrylic type reactive resins, epoxy-polyamide resins, nitrocellulose-melamine resins, mixtures of high molecular weight polyester resins and isocyanate prepolymers, mixtures of methacrylate copolymers and diisocyanate prepolymers, mixtures of polyester-polyols and polyisocyanates, urea-formaldehyde resins, mixtures of low molecular weight glycols, high molecular weight diols and triphenylmethane triisocyanates, polyamine resins and mixtures thereof.

These resins and polymers are disclosed in U.S. Pat. No. 3,630,771 and Japanese Patent Publication Nos. 8103/64, 9779/65, 7192/66, 8016/66, 14275/66, 18179/67, 12081/68, 28023/69, 14501/70, 24902/70, 13103/71, 22065/72, 22066/72, 22067/72, 22072/72, 22073/72, 28045/72, 28048/72 and 28922/72.

These binders can be used alone or in combination thereof. Other additives which can be used include dispersing agents, lubricants, abrasives, etc.

The abrasives include alumina, silicon carbide, chromium oxide, corundum, artificial corundum, diamond, artificial diamond, garnet and emery (main component: corundum and magnetite), etc. The average particle size of the abrasives is 0.05 to 5 microns, preferably 0.1 to 2 microns. These abrasives can be used in an amount of 2 to 20 parts by weight based on 100 parts of the binder. The abrasives are disclosed in Japanese Patent Application No. 26749/73 and U.S. Pat. No. 3,687,725.

Organic solvents which can be used for kneading and/or dispersing and coating a ferromagnetic coating composition are those having a boiling point in the range of 56° C. to 140° C. and an evaporation rate of 0.40 to 7.50, as determined by the method described in *Modern Surface Coatings*, 1965, John Wiley and Sons (n-butyl acetate=1.00). Examples of organic solvents are ketones such as acetone, methyl ethyl ketone, methyl isobutyl ketone or cyclohexanone; alcohols such as methanol, ethanol, propanol or butanol; esters such as methyl acetate, ethyl acetate, butyl acetate, ethyl lactate or glycol acetate monoethyl ether; glycol ethers such as diethyl ether, glycol dimethyl ether, glycol monoethyl ether or dioxane; aromatic hydrocarbons such as benzene, toluene or xylene; chlorinated hydrocarbons such as methylene chloride, ethylene chloride, carbon tetrachloride, chloroform, ethylene chlorohydrin or dichlorobenzene; etc. Particularly preferred organic solvents are ketones and esters as exemplified above. The organic solvent can be preferably used in an amount of about 100 to about 500 parts by weight per 100 parts by weight of the ferromagnetic powder.

A magnetic layer can be formed by dissolving or dispersing the above-described various components in the organic solvent and applying the resulting coating composition to a support.

A support for magnetic recording medium has a thickness of 2.5 to 100μ, preferably 3 to 40μ, and includes polyesters such as polyethylene terephthalate or polyethylene naphthalate; polyolefins such as polypropylene; cellulose derivatives such as cellulose triacetate or cellulose diacetate; vinyl resins such as polyvinyl chloride; other plastic films such as polycarbonate; metal sheets such as aluminum or copper; ceramics, glass and the like. If desired, a support having a backing layer comprising carbon black or an inorganic powder and a binder can be used.

A magnetic layer can be coated on a support by an air doctor coating method, a blade coating method, an air knife coating method, a squeeze coating method, a dip coating method, a reverse roll coating method, a transfer roll coating method, a gravure coating method, a kiss coating method, a cast coating method or a spray coating method. Such methods are well known in the art and are disclosed in *Coating Engineering*, pages 253 to 277 (1971) published by Asakura Shoten (Japan).

The magnetic layer coated on the support is subjected, if necessary, to magnetic orientation and then dried. Further, it can be subjected to surface smoothening step and slit into the desired shape or form to obtain magnetic recording medium of the present invention. These steps and operations are disclosed in Japanese Patent Publication Nos. 23625/65 and 28368/64, and U.S. Pat. No. 3,473,960. The method as disclosed in Japanese Patent Publication No. 13181/66 is considered basic and important technique in the field.

The present invention is further illustrated in greater detail by the following Examples, but it should be understood that the components, ratios and order of steps or operations can be varied without departing from the scope of the present invention. Therefore, the present invention should not be limited to these Examples. Unless otherwise indicated, all parts are by weight.

EXAMPLE 1

The following composition was introduced into a ball mill and thoroughly kneaded. To the composition, 50 parts of polyisocyanate (trade name "Dismodur L-75" manufactured by Sumitomo Bayer Co.) was added and the mixture was uniformly dispersed to provide a magnetic coating composition.

| | parts |
|---|---|
| $\gamma$-Fe$_2$O$_3$ powder | 300 |
| Vinyl chloride-vinyl acetate (87:13) copolymer (polymerization degree: about 400) | 30 |
| Epoxy resin (epoxy group content: 0.56) | 30 |
| Carbon black (S$_{BET}$: 160 m$^2$/g) | 5 |
| Ethyl acetate | 500 |
| Compound shown in Table 1 | 3 |

The thus prepared ferromagnetic composition was stirred for 3 hours by means of a jet agitator, and then coated on a polyethylene terephthalate film at a coating speed of 100 m/min. by a blade coating method after measuring the viscosity. The coating property of the composition is shown in Table 1.

TABLE 1

| Test No. | Compound | Viscosity (poise) | Coating Property |
|---|---|---|---|
| 1 | — | 66.5 | Good |
| 2 | Anhydrosorbitol di- and tetrastearate* | 73 | " |
| 3 | Anhydrosorbitol di- and tetraacetate* | 69 | " |
| 4** | Anhydrosorbitol tristearate | 116 | Coating was impossible |
| 5** | Anhydrosorbitol monostearate | 114 | Coating was impossible |
| 6** | Anhydrosorbitol trioleate | 116 | Coating was impossible |

*A mixture of compounds of formulae (I), (II), and (III)
**Comparative Examples

It is apparent from Table 1 that anhydrosorbitol di- and/or tetra-fatty acid esters provide better coating property than test Nos. 4, 5 and 6 which are Comparative Examples.

EXAMPLE 2

The following composition was introduced into a ball mill and thoroughly kneaded. To the composition, 35 parts of "Dismodur L-75" was added and uniformly dispersed to provide a ferromagnetic composition.

| | parts |
|---|---|
| $\gamma$-Fe$_2$O$_3$ powder | 300 |
| Vinyl chloride-vinyl acetate copolymer (weight ratio 87:13, polymerization degree: about 400) | 30 |
| Epoxy resin (epoxy group content: 0.56) | 30 |
| Carbon black (S$_{BET}$: 50 m$^2$/g) | 5 |
| Ethyl acetate | 250 |
| Cyclohexanone | 250 |
| Compound shown in Table 2 | amount shown in Table 2 |

The thus prepared ferromagnetic composition was applied to a polyester film support and dried to provide a magnetic recording tape. The test results are shown in Table 2 below.

TABLE 2

| Test No. | Compound | Amount (part) | Number of Runs | RF Output (dB) |
|---|---|---|---|---|
| 7 | — | 0 | 15 | 0 |
| 8 | Anhydrosorbitol di- and tetrastearate* | 1 | More than 60 | +1.2 |
| 9 | Anhydrosorbitol di- and tetrastearate* | 10 | More than 60 | +0.8 |
| 10** | Silicone | 10 | 20 | RF output cannot be measured due to the occurence of substantial dropout |
| 11** | Glycerol tristearate | 10 | More than 60 | Foreign matters were observed on magnetic layer |
| 12** | Butyl palmitate | 10 | 12 | +0.8 |

*A mixture of compounds of formulae (I), (II) and (III)
**Comparative Examples

The methods used for measuring the physical properties in the Examples are as follows:

The "number of runs" of the magnetic recording tape is the number until tape squeak was caused when the tape was continuously runs in magnetic recording devices at 30° C. and 80% relative humidity. The test was repeated twice and the average number of tape runs is shown in Table 2.

The RF (radio frequency) output is the relative output (dB) where a signal of 4 MHz is recorded and reproduced.

It is apparent from Table 2 that anhydrosorbitol di- and/or tetra-fatty acid esters provide better running properties and RF output than conventional lubricants represented by Test Nos. 10 to 12.

While the invention has been described in detail and with reference to specific embodiments thereof, it will be apparent to one skilled in the art that various changes and modifications can be made therein without departing from the spirit and scope thereof.

What is claimed is:

1. A magnetic recording medium comprising a support base having coated thereon a magnetic layer comprised of ferromagnetic powders dispersed in a binder, and at least one of anhydrosorbitol fatty acid non-hydroxy ester compounds represented by the formula selected from the group consisting of (I), (II) and (III):

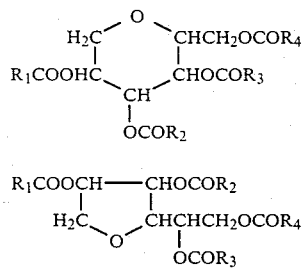

and

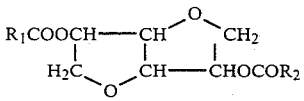

wherein $R_1$, $R_2$, $R_3$ and $R_4$ each represents a saturated alkyl group having 1 to 22 carbon atoms or an alkylene group having 2 to 22 carbon atoms.

2. A magnetic recording medium as claimed in claim 1, wherein the ferromagnetic powder is present in an amount of 50 to 2,000 parts by weight per 100 parts by weight of the binder and further wherein the anhydrosorbitol fatty acid non-hydroxy ester compound is present in an amount in the range of 0.05 to 20 parts by weight per 100 parts by weight of the ferromagnetic powder.

3. A magnetic recording medium as claimed in claim 2, wherein the anhydrosorbitol fatty acid non-hydroxy ester compound is present in an amount in the range of 0.1 to 10 parts by weight per 100 parts by weight of the ferromagnetic powder.

4. A magnetic recording medium as claimed in claim 3, wherein the anhydrosorbitol fatty acid non-hydroxy ester compound is present in an amount in the range of 0.5 to 5 parts by weight per 100 parts by weight of the ferromagnetic powder.

5. A magnetic recording medium as claimed in claim 2, wherein the magnetic layer is further comprised of a polyisocyanate compound.

6. A magnetic recording medium as claimed in claim 5, wherein the magnetic layer is further comprised of a carbon black having a specific surface area of more than about 30 $m^2/g$ and a viscosity-increasing function.

7. A magnetic recording medium as claimed in claim 1, wherein said anhydrosorbitol fatty acid non-hydroxy ester compound is selected from the group consisting of anhydrosorbitol di- and tetraacetate, anhydrosorbitol di- and tetrastearate, anhydrosorbitol di- and tetraoleate, anhydrosorbitol di- and tetrapalmitate, anhydrosorbitol di- and tetralaurate, and anhydrosorbitol di- and tetramyristate.

8. A magnetic recording medium as claimed in claim 7, wherein said anhydrosorbitol fatty acid non-hydroxy ester compound is selected from the group consisting of anhydrosorbitol di- and tetraacetate and anhydrosorbitol di- and tetrastearate.

9. A magnetic recording medium as claimed in claim 6, wherein the carbon black has an average particle diameter in the range of 10 to 300 m$\mu$.

10. A magnetic recording medium as claimed in claim 2, wherein the support base has a thickness in the range of 2.5 to 100$\mu$.

11. A magnetic recording medium as claimed in claim 10, wherein the support base has a thickness in the range of 3 to 40$\mu$.

12. A magnetic recording medium as claimed in claim 1, wherein $R_1$, $R_2$, $R_3$ and $R_4$ each represents a saturated alkyl group having 1 to 18 carbon atoms or an alkylene group having 2 to 18 carbon atoms.

13. A magnetic recording medium as claimed in claim 1, wherein $R_1$, $R_2$, $R_3$ and $R_4$ each represents a saturated alkyl group having 1 to 18 carbon atoms.

* * * * *